(12) United States Patent
Tokuyama

(10) Patent No.: US 11,704,420 B2
(45) Date of Patent: *Jul. 18, 2023

(54) TERMINAL DEVICE AND COMPUTER PROGRAM

(71) Applicant: Masaaki Tokuyama, Tokyo (JP)

(72) Inventor: Masaaki Tokuyama, Tokyo (JP)

( * ) Notice: Subject to any disclaimer, the term of this patent is extended or adjusted under 35 U.S.C. 154(b) by 80 days.

This patent is subject to a terminal disclaimer.

(21) Appl. No.: 17/161,962

(22) Filed: Jan. 29, 2021

(65) Prior Publication Data
US 2021/0157943 A1 May 27, 2021

Related U.S. Application Data

(63) Continuation of application No. 15/570,035, filed as application No. PCT/JP2016/063614 on May 2, 2016, now Pat. No. 10,929,550.

(30) Foreign Application Priority Data

Apr. 30, 2015 (JP) ................. 2015-093729

(51) Int. Cl.
*G06F 21/62* (2013.01)
*G06F 21/32* (2013.01)
(Continued)

(52) U.S. Cl.
CPC .......... *G06F 21/6209* (2013.01); *G06F 21/32* (2013.01); *G06F 21/602* (2013.01);
(Continued)

(58) Field of Classification Search
CPC .... G06F 21/6209; G06F 21/32; G06F 21/602; G06F 21/6218; H04L 9/0866; H04L 9/14
See application file for complete search history.

(56) References Cited

U.S. PATENT DOCUMENTS 6,061,733 A 5/2000 Bodin et al.
7,111,173 B1 9/2006 Scheidt
(Continued)

FOREIGN PATENT DOCUMENTS

CN 102664928 A 9/2012
JP 2000-059355 A 2/2000
(Continued)

OTHER PUBLICATIONS

S. P. Venkatachalam, P. Muthu Kannan and V. Palanisamy, "Combining cryptography with biometrics for enhanced security," 2009 International Conference on Control, Automation, Communication and Energy Conservation, 2009, pp. 1-6. (Year: 2009).*
(Continued)

*Primary Examiner* — Catherine Thiaw
*Assistant Examiner* — Hany S. Gadalla
(74) *Attorney, Agent, or Firm* — Foley & Lardner LLP

(57) ABSTRACT

As a saving target file is specified, a controller (110) executes a file management program to divide the saving target file, encrypt a divided file using a cryptographic key corresponding to the logical address of the divided file, save the divided file at a storing destination corresponding to the logical address, and create a table associating the logical address, the cryptographic key, and the saving destination physical address. As a reading target file is specified, the controller (110) identifies the corresponding divided file from the logical address, identifies the saving destination physical address of the divided file and the cryptographic key with reference to the table, reads the divided file from the identified physical address, and decrypts the divided file using the identified cryptographic key.

13 Claims, 18 Drawing Sheets

(51) Int. Cl.
*G06F 21/60* (2013.01)
*H04L 9/08* (2006.01)
*H04L 9/14* (2006.01)

(52) U.S. Cl.
CPC ........ *G06F 21/6218* (2013.01); *H04L 9/0866* (2013.01); *H04L 9/14* (2013.01)

(56) References Cited

U.S. PATENT DOCUMENTS

| | | | |
|---|---|---|---|
| 7,697,773 B1* | 4/2010 | Bauchspies | H03M 7/40 382/246 |
| 8,090,162 B2 | 1/2012 | Harris | |
| 8,769,270 B2 | 7/2014 | Orsini et al. | |
| 2002/0071554 A1* | 6/2002 | Scheidt | H04L 9/0877 380/44 |
| 2003/0174867 A1 | 9/2003 | Harney et al. | |
| 2007/0118885 A1 | 5/2007 | Elrod | |
| 2008/0065901 A1 | 3/2008 | Takaku et al. | |
| 2008/0148375 A1 | 6/2008 | Yamamoto et al. | |
| 2008/0189762 A1 | 8/2008 | Toriumi | |
| 2008/0235515 A1 | 9/2008 | Yedidia et al. | |
| 2009/0271634 A1 | 10/2009 | Boult et al. | |
| 2009/0300737 A1* | 12/2009 | Crandell | H04L 63/0861 707/999.01 |
| 2011/0099200 A1 | 4/2011 | Blount et al. | |
| 2011/0116628 A1 | 5/2011 | Wack et al. | |
| 2011/0197263 A1 | 8/2011 | Stinson, III | |
| 2011/0258460 A1 | 10/2011 | Pizano et al. | |
| 2012/0185698 A1 | 7/2012 | Fiske | |
| 2012/0250949 A1 | 10/2012 | Abiko | |
| 2013/0263282 A1 | 10/2013 | Yamada et al. | |
| 2013/0272586 A1 | 10/2013 | Russo | |
| 2014/0013112 A1 | 1/2014 | Cidon et al. | |
| 2014/0032924 A1 | 1/2014 | Durham et al. | |
| 2014/0133711 A1 | 5/2014 | Abe | |
| 2014/0173715 A1 | 6/2014 | Yano | |
| 2014/0211944 A1* | 7/2014 | Hayward | H04L 9/0894 380/281 |
| 2014/0281536 A1 | 9/2014 | Livolsi et al. | |
| 2014/0302818 A1 | 10/2014 | Fyke | |
| 2015/0043792 A1 | 2/2015 | Nada et al. | |
| 2015/0154392 A1 | 6/2015 | Bao et al. | |
| 2015/0172286 A1 | 6/2015 | Tomlinson et al. | |
| 2015/0269389 A1* | 9/2015 | Lee | G06F 21/6209 726/5 |
| 2016/0063235 A1 | 3/2016 | Tussy | |
| 2016/0173455 A1 | 6/2016 | Ramachandra Rao et al. | |
| 2016/0294555 A1 | 10/2016 | Jakobsson et al. | |
| 2017/0142102 A1 | 5/2017 | Toyoshima et al. | |
| 2017/0180362 A1 | 6/2017 | Du | |
| 2018/0181737 A1 | 6/2018 | Tussy | |
| 2018/0285573 A1 | 10/2018 | Lantz et al. | |

FOREIGN PATENT DOCUMENTS

| | | |
|---|---|---|
| JP | 2005-078228 A | 3/2005 |
| JP | 2005-100063 A | 4/2005 |
| JP | 2005-123883 A | 5/2005 |
| JP | 2005-146709 A | 6/2005 |
| JP | 2006-011591 A | 1/2006 |
| JP | 2006-085249 A | 3/2006 |
| JP | 2007-004796 A | 1/2007 |
| JP | 2007-206934 A | 8/2007 |
| JP | 2007-281919 A | 10/2007 |
| JP | 2009-134482 A | 6/2009 |
| JP | 2010-198536 A | 9/2010 |
| JP | 2013-120600 A | 6/2013 |
| JP | 2014-085913 A | 5/2014 |
| JP | 2015-001800 A | 1/2015 |

OTHER PUBLICATIONS

P. G. Rudrakshi and S. K. M. Hatture, "A model for secure information storage and retrieval on cloud using multimodal biometric cryptosystem," 2014 International Conference on Computer and Communication Technology (ICCCT), 2014, pp. 169-174, doi: 10.1109/ICCCT.2014.7001487. (Year: 2014).*

English-language translation of Notification of Reasons for Rejection dated Oct. 18, 2016 in related Japanese Appl. 2016-555620 (4 pgs.).

International Search Report dated Jul. 19, 2016 in PCT/JP2016/063614 with English-language translation (4 pgs.).

International Search Report dated Jun. 14, 2016 in PCT/JP2016/063613 with English-language translation (4 pgs.).

Notice of Allowance issued in U.S. Appl. No. 15/570,168 dated Jun. 5, 2019.

Non-Final Office Action on U.S. Appl. No. 15/570,035 dated May 16, 2019.

* cited by examiner

FIG. 2D

FILE MANAGEMENT TABLE FMT

| Li | PAi (PBi) | KA (KB) |

FIG. 5

TELEPHONE BOOK FILE

| NAME | ADDRESS | AGE | ... | TELEPHONE NUMBER | EMAIL ADDRESS |
|---|---|---|---|---|---|
| | | | | | |

FIG. 6

SCHEDULE FILE

| MONTH/ DATE | TITLE | PLACE | ... | TIME | EMAIL ADDRESS OF PERSON IN CHARGE |
|---|---|---|---|---|---|
| | | | | | |

FIG. 9

FILE MANAGEMENT TABLE FMT

FILE NAME: FI

DATA MANAGEMENT TABLE DMT

| DATA NUMBER i | SIZE AFTER ENCRYPTION | CRYPTOGRAPHIC KEY |
|---|---|---|
| 1 | 509 | KF |
| 2 | 499 | KV |
| 3 | 487 | KI |
| 4 | 509 | KF |
| ⋮ | ⋮ | ⋮ |

CLUSTER MANAGEMENT TABLE CMT

| CLUSTER NUMBER j | SAVING DESTINATION AND PHYSICAL ADDRESS | DATA NUMBER i |
|---|---|---|
| 1 | PA1 | 1-8 |
| 2 | PB2 | 9-16 |
| 3 | PA3 | 17-24 |
| ⋮ | ⋮ | ⋮ |

FIG. 10

DIVISION SIZE TABLE DST

| BIOLOGICAL INFORMATION | CONDITION | DIVISION SIZE S | |
|---|---|---|---|
| FINGERPRINT | END POINTS $\geq$ BRANCH POINTS | 509 byte | $S_F$ |
| | END POINTS $<$ BRANCH POINTS | 503 byte | |
| VOICEPRINT | $f_{top} \geq f_{second}$ | 499 byte | $S_V$ |
| | $f_{top} < f_{second}$ | 491 byte | |
| IRIS | $N_1 \geq N_0$ | 487 byte | $S_I$ |
| | $N_1 < N_0$ | 479 byte | |

CRYPTOGRAPHIC KEY TABLE EKT

| BIOLOGICAL INFORMATION | CONDITION | CRYPTOGRAPHIC KEY |
|---|---|---|
| FINGERPRINT | END POINTS $\geq$ BRANCH POINTS + 3 | KF1 |
| FINGERPRINT | END POINTS $<$ BRANCH POINTS + 3 | KF2 |
| VOICEPRINT | $f_{top} \geq f_{third}$ | KV1 |
| VOICEPRINT | $f_{top} < f_{third}$ | KV2 |
| IRIS | $N_1 \geq N_0 - 2$ | KI1 |
| IRIS | $N_1 < N_0 - 2$ | KI2 |

FIG. 17A

SAVING DESTINATION TABLE SAT

| BIOLOGICAL INFORMATION | CONDITION | SAVING DESTINATION |
|---|---|---|
| FINGERPRINT | END POINTS $\geq$ BRANCH POINTS + 1 | ODD NUMBER CLUSTER: 210<br>EVEN NUMBER CLUSTER: 220 |
| | BRANCH POINTS − 1 $<$ END POINTS $<$ BRANCH POINTS + 1 | ODD NUMBER CLUSTER: 220<br>EVEN NUMBER CLUSTER: 111 |
| | END POINTS $<$ BRANCH POINTS 1 | ODD NUMBER CLUSTER: 111<br>EVEN NUMBER CLUSTER: 210 |

FIG. 17B

SAVING DESTINATION TABLE SAT

| BIOLOGICAL INFORMATION | CONDITION | SAVING DESTINATION |
|---|---|---|
| FINGERPRINT | END POINTS $\geq$ BRANCH POINTS + 1 | 210 |
| | BRANCH POINTS − 1 $<$ END POINTS $<$ BRANCH POINTS + 1 | 220 |
| | END POINTS $<$ BRANCH POINTS 1 | 111 |

FIG. 18A

BIOLOGICAL INFORMATION SELECTION TABLE BST

| CONDITION (FINGERPRINT INFORMATION) | BIOLOGICAL INFORMATION USED IN ENCRYPTION |
|---|---|
| END POINTS $\geq$ BRANCH POINTS + 5 | Mod (3) = 1: FINGERPRINT<br>Mod (3) = 2: VOICEPRINT<br>Mod (3) = 0: IRIS |
| END POINTS $<$ BRANCH POINTS + 5 | Mod (3) = 1: FINGERPRINT<br>Mod (3) = 2: IRIS<br>Mod (3) = 0: VOICEPRINT |

FIG. 18B

BIOLOGICAL INFORMATION SELECTION TABLE BST

| CONDITION (FINGERPRINT INFORMATION) | BIOLOGICAL INFORMATION USED IN ENCRYPTION |
|---|---|
| END POINTS $\geq$ BRANCH POINTS | Mod (2) = 1: IRIS<br>Mod (2) = 0: VOICEPRINT |
| END POINTS $<$ BRANCH POINTS | IRIS |

FIG. 19
PAD DATA POSITION SELECTION TABLE
| CONDITION (IRIS INFORMATION) | PAD DATA POSITION |
|---|---|
| $N_1 \geq N_0$ | AT BEGINNING |
| $N_1 < N_0$ | FROM 100TH BYTE FROM BEGINNING |
FIG. 20A
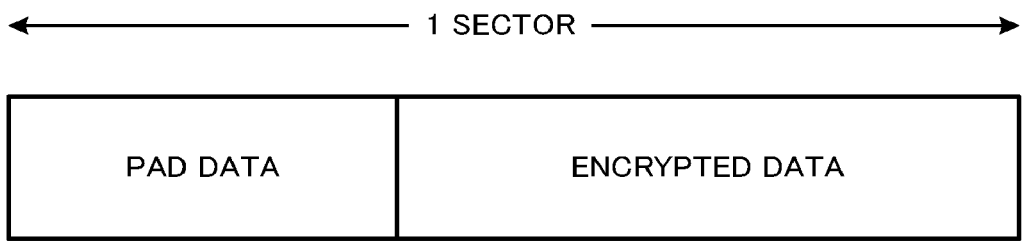
FIG. 20B
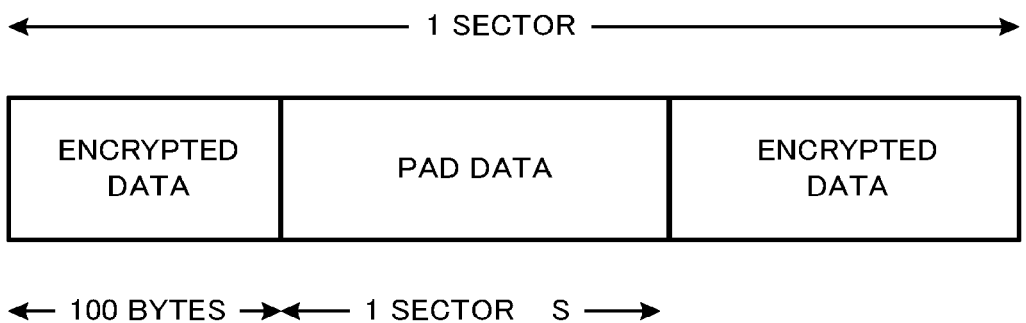

TERMINAL DEVICE AND COMPUTER PROGRAM

TECHNICAL FIELD

The present disclosure relates to a terminal device having the function of encrypting data and a computer program.

BACKGROUND ART

There is an increasing demand for data security. Various proposals have been made for maintaining the security (For example, see Patent Literature 1). Patent Literature 1 discloses double-encryption of stored data for protection.

CITATION LIST

Patent Literature

Patent Literature 1: Unexamined Japanese Patent Application Kokai Publication No. 2015-1800.

SUMMARY OF INVENTION

Technical Problem

According to the technique described in the Patent Literature 1, if the cryptographic key leaks, all information can be reproduced.

An objective of the disclosure is to provide a terminal device capable of protecting data more securely.

Solution to Problem

In order to solve the above problem, the terminal device according to the present disclosure comprises:

dividing means for dividing a saving target file to create divided files;

selection means for selecting one of multiple encryption methods and one of multiple storing destinations;

saving means for encrypting a divided file created by the dividing means by an encryption method selected by the selection means and saving the encrypted, divided file at a physical storing destination selected by the selection means; and a table associating and storing information identifying the divided file, the encryption method, and an saving destination physical address.

The terminal device may be configured as follows:

the saving means further saves information identifying the encryption method at the physical storing destination, and saves the divided file created by the dividing means and information identifying the encryption method used in encrypting the divided file at different storing destinations.

Moreover, for example, the terminal device may further comprise:

acquisition means for acquiring biological information of a user; and division size setting means for obtaining a divided file size from conversion information converting the biological information acquired by the acquisition means to the divided file size, wherein the dividing means creates a divided file of the size obtained by the division size setting means.

The terminal device may be configured as follows:

the biological information includes multiple kinds of biological information, the division size setting means obtains from the conversion information the divided file size for each of the multiple kinds of biological information, and the dividing means divides the saving target file to create the divided files of one or multiple sizes among the sizes obtained by the division size setting means.

The terminal device may be configured as follows:

the division size setting means is a division size table associating and storing a condition based on biological information of a user and a divided file size, the selection means further selects the divided file size from the division size table based on the biological information acquired by the acquisition means, and the dividing means creates the divided file of the size selected by the selection means.

The terminal device may further comprise:

acquisition means for acquiring biological information of a user; and creation means for creating a cryptographic key from the biological information acquired by the acquisition means, wherein the saving means encrypts the divided file using the cryptographic key created by the creation means.

The terminal device may be configured as follows:

the biological information includes multiple kinds of biological information, the creation means creates the cryptographic key from each of the multiple kinds of biological information, and the saving means encrypts the divided file using one or multiple cryptographic keys among the cryptographic keys each created by the creation means.

Moreover, for example, the terminal device may further comprise:

divided file identification means for identifying the divided file corresponding to a reading target file;

identification means for identifying the saving destination physical address of the divided file and the encryption method with reference to the table, and reproduction means for reading the divided file from the physical address identified by the identification means and decrypting the divided file based on the identified encryption method.

The divided file comprises, for example, data for one cluster.

It is desirable that at least one of the multiple storing destinations is detachably mounted.

Alternatively, it is desirable that at least one of the multiple storing destinations is disposed on a cloud.

A computer program for making a computer function as the above-described terminal device is included in the present disclosure.

Advantageous Effects of Invention

The present disclosure changes the encrypting method and the saving destination for each divided data, making decryption more difficult. As a result, data can be protected more securely. On the other hand, processing load is low.

BRIEF DESCRIPTION OF DRAWINGS

FIG. 2D is a chart showing an exemplary configuration of the file management table;

FIG. 5 is a chart showing an exemplary configuration of a telephone book file;

FIG. 6 is a chart showing an exemplary configuration of a schedule file;

FIG. 7 is a block diagram of a modified embodiment of the terminal device according to Embodiment 1 and the like;

FIG. 8 is a block diagram of the terminal device according to Embodiment 2 of the present disclosure and the like;

FIG. 9 is a chart showing an example of the file management table according to Embodiment 2;

FIG. 10 is a chart showing an example of the division size table according to Embodiment 2;

FIG. 17A is a chart showing an example of the saving destination table for changing the saving destination according to the biological information;

FIG. 17B is a chart showing another example of the saving destination table for changing the saving destination according to the biological information;

FIG. 18A is a chart showing an example of the biological information selection table for changing the biological information used in encryption according to the biological information;

FIG. 18B is a chart showing another example of the biological information selection table for changing the biological information used in encryption according to the biological information;

FIG. 19 is a chart showing an example of the pad data position selection table for changing the position of pad data according to the biological information;

FIG. 20A is a chart showing an exemplary configuration of a sector realized by the pad data position selection table in FIG. 19; and FIG. 20B is another chart showing an exemplary configuration of a sector realized by the pad data position selection table in FIG. 19.

DESCRIPTION OF EMBODIMENTS

Embodiment 1

The terminal device according to Embodiment 1 of the present disclosure will be described below with reference to the drawings.

A terminal device 10 of this embodiment is a so-called smartphone and comprises the function of encrypting and saving data in a distributed manner.

Figure 1:
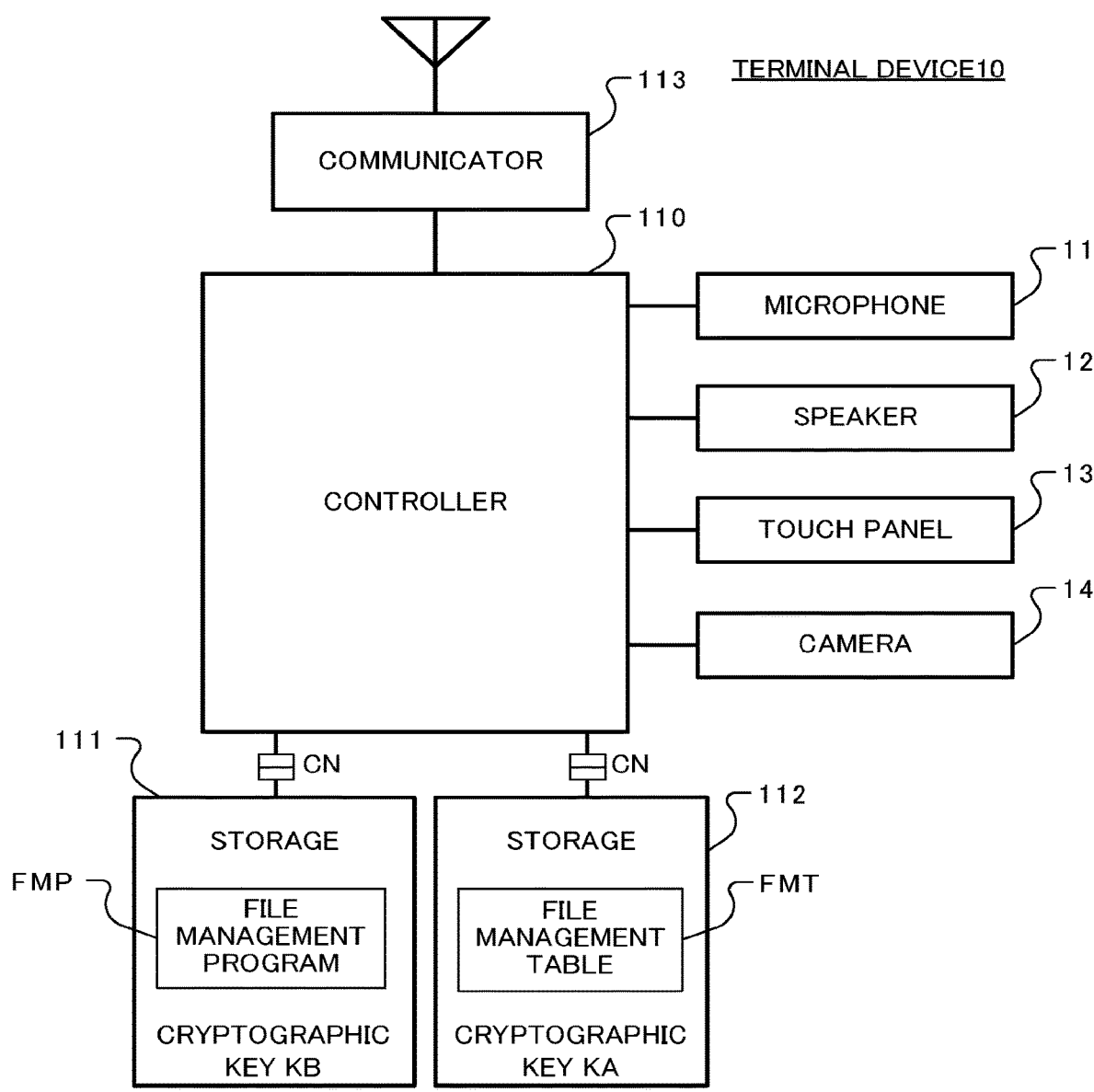
FIG. 1 is a block diagram of the terminal device according to Embodiment 1 of the present disclosure.

The terminal device 10 comprises, as shown in FIG. 1, a controller 110, and a microphone 11, a speaker 12, a touch panel 13, a camera 14, storages 111 and 112, and a communicator 113, which are connected to the controller 110.

The microphone 11 is a device to pick up voice of the user during voice conversation. The speaker 12 outputs received voice during voice conversation. The touch panel 13 is configured by layering a touch sensor and a display. The touch sensor determines the position of a user operation. The display displays various kinds of information according to the control of the controller 110.

The camera 14 is disposed on the front of the terminal device 10 and captures an image of an object.

The controller 110 comprises a processor, a random access memory (RAM), and the like, and executes application programs stored in the storages 111 and 112. The application programs include a file management program, an email program, a schedule management program, and the like. The controller 110 executes the file management program to save various files (data) in a distributed and encrypted manner and to read from multiple locations and decrypt the data into original data.

The storages 111 and 112 are nonvolatile memories used as auxiliary storage devices and comprise a flash memory or the like. The storage 111 saves a file management program FMP and the storage 112 stores a file allocation table (a file management table) FMT. Moreover, the storages 111 and 112 save highly confidential information such as so-called telephone book data and schedule data in a distributed manner. Moreover, the storages 111 and 112 are each detachably connected to the terminal device 10. Specifically, the storages 111 and 112 are mounted in slots or the like formed in the enclosure of the terminal device 10 and connected to the controller 110 via connectors CN.

The communicator 113 performs wireless communication with a base station or a nearby access point according to the control of the controller 110 for voice conversation, email communication, data communication, and the like.

The file saving procedure executed by the controller 110 executing the file management program FMP will be described next with reference to FIGS. 2A to 2D.

Figure 2A:
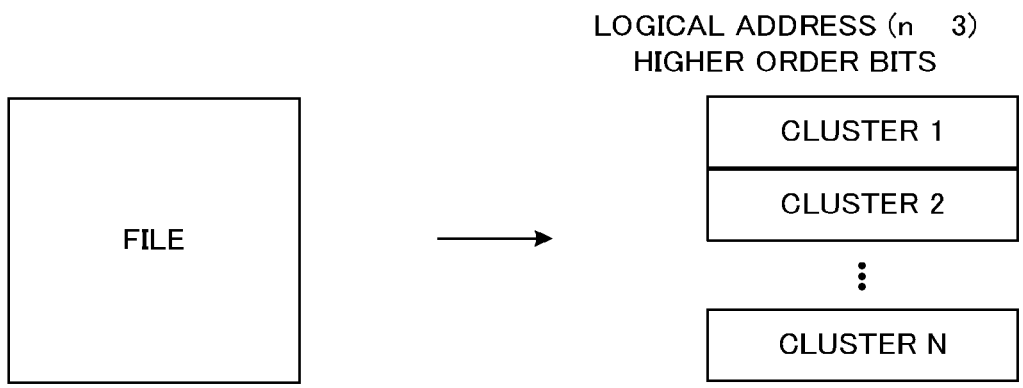
FIG. 2A is a chart for explaining the file division executed by the terminal device in FIG. 1.
Figure 2B:
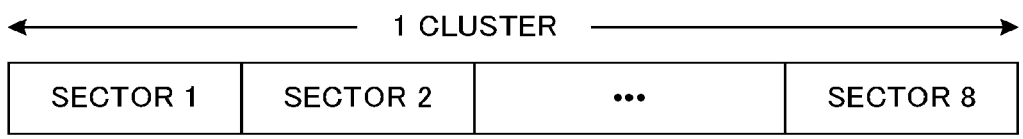
FIG. 2B is a chart for explaining the cluster configuration according to Embodiment 1.

As shown in FIG. 2A, one file is divided into clusters that are the minimum units for a computer to access a disk. Any number of sectors can be included in a cluster. However, it is assumed in the following explanation that eight sectors are included as shown in FIG. 2B. It is assumed in this embodiment that one sector has 512 bytes. Thus, one cluster has a size of 4,096 bytes (approximately 4 K bytes).

An application program manages the sectors and clusters using logical addresses.

A cluster is specified by the n−3 higher order bits of an n-bit logical address. Each sector in a cluster is specified by the three lower order bits of a logical address.

In the following explanation, the logical address of a cluster means the (n−3) higher order bits of a whole n-bit logical address.

Figure 2C:
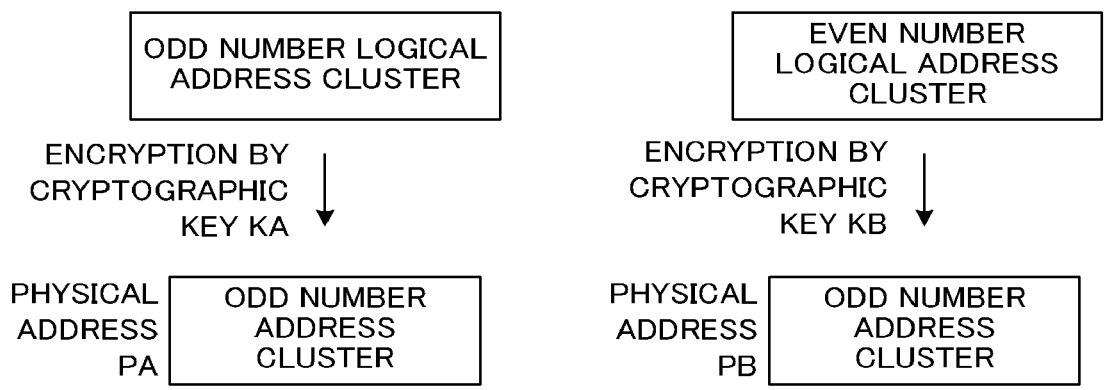
FIG. 2C is a chart for explaining the encryption process executed by the terminal device in FIG. 1.

For saving a file in a storage, as shown in FIG. 2C, the file management program FMP stored in the storage 111 processes a cluster having an odd number logical address ((n−3) bits) (hereafter, an odd number logical address cluster) and a cluster having an even number logical address (hereafter, an even number logical address cluster) differently.

First, the file management program FMP encrypts a cluster having an odd number logical address using a cryptographic key KA and saves the cluster at any physical address PA on the storage 111. The cryptographic key KA is saved on the storage 112. On the other hand, the file management program FMP encrypts a cluster having an even number logical address using a cryptographic key KB and saves the cluster at any physical address PB on the storage 112. The cryptographic key PB is saved on the storage 111.

Figure 2D:
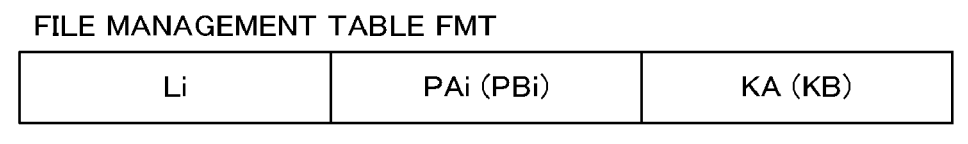

After performing the above processing, the file management program FMP creates a file management table FMT shown in FIG. 2D. This means that a cluster specified by a logical address Li is saved at a physical address PAi (or PBi) and encrypted using a key KA (or KB). The file management table is saved in the controller 110. Here, the key is specified by the logical address Li and therefore the key KA or KB does not need to be stored.

The procedure to reproduce a file encrypted and saved in a distributed manner as described above will be described next.

Receiving a file access request from an application program, the file management program FMP obtains the logical address (n−3 bits as described above) of a cluster constituting the access target file.

Receiving a file access request from an application program, the file management program FMP obtains the logical address of the first cluster constituting the access target file. The access request includes, for example, the logical address of the first sector. The file management program FMP obtains the logical address of the first cluster from the logical address of the first sector. Identifying the logical address of the first cluster, the file management program FMP obtains the corresponding physical address with reference to the file management table FMT and further identifies the cryptographic key. Then, the file management program FMP reads data from the corresponding physical address, encodes the data using the identified cryptographic key, and transmits the data to the application.

The file management program FMP executes the same operation on the subsequent clusters. Decrypting and transmitting all clusters to the application program, the file management program FMP ends the procedure.

Figure 3:
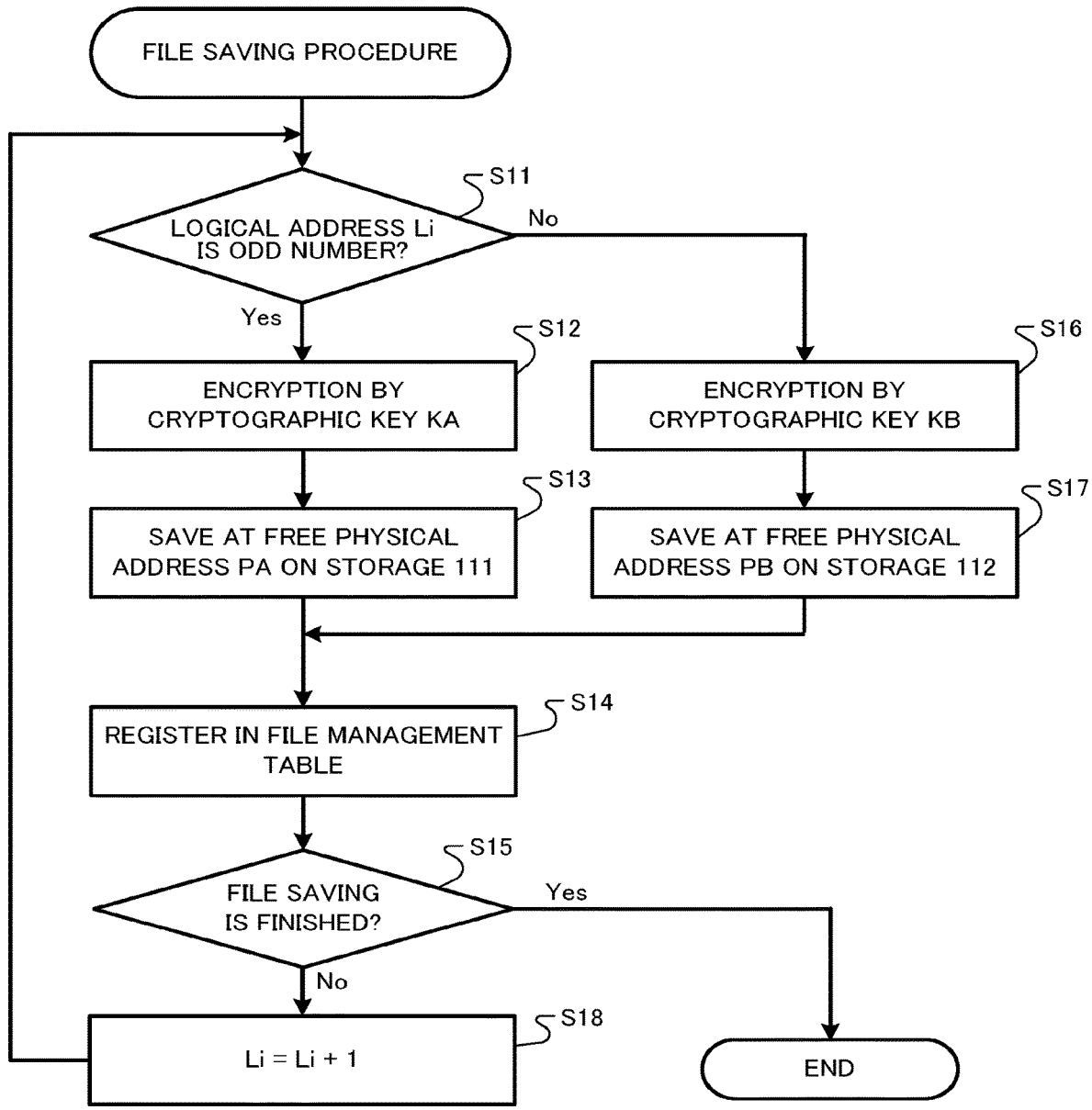
FIG. 3 is a flowchart of the file saving procedure executed by the terminal device in FIG. 1.

The file saving procedure by the controller 110 will be described next with reference to the flowchart shown in FIG. 3. First, as a file saving request is made by an application program, the controller 110 starts the file saving procedure shown in FIG. 3.

First, the controller 110 executes the file management program FMP to identify a logical address Li of the first cluster constituting the saving target file and determines whether the logical address Li is an odd number or an even number (Step S11). If the logical address Li is an odd number (Step S11: Yes), as shown in FIG. 2C, the controller 110 encrypts the processing target cluster using the cryptographic key KA (Step S12). The controller 110 saves the encrypted cluster in a free area on the storage 111 (Step S13).

Subsequently, the controller 110 associates and registers in the file management table FMT the logical address Li of the processed cluster, the physical address PAi of the saving area, and the cryptographic key KA as shown in FIG. 2D (Step S14).

Subsequently, the controller 110 determines whether the file saving is finished (Step S15). If not finished (Step S15: No), the controller 110 increments the logical address Li by +1 (Step S18). Subsequently, the processing returns to the Step S11 and the next cluster is processed.

On the other hand, if determined in the Step S11 that the logical address of the processing target cluster is an even number (Step S11: No), as shown in FIG. 2C, the controller 110 encrypts the processing target cluster using the cryptographic key KB (Step S16). The controller 110 saves the encrypted cluster in a free area on the storage 112 (Step S17).

Subsequently, the controller 110 associates and registers in the file management table FMT the logical address Li of the processed cluster, the physical address PBi of the saving area, and the cryptographic key KB as shown in FIG. 2D (Step S14).

Subsequently, the controller 110 determines whether the file saving is finished (Step S15). If not finished (Step S15: No), the controller 110 increments the logical address Li by +1 (Step S18). Subsequently, the processing returns to the Step S11 and the next cluster is processed.

If determined in the Step S15 that the file saving is finished (Step S15: Yes), the file saving procedure ends.

Figure 4:
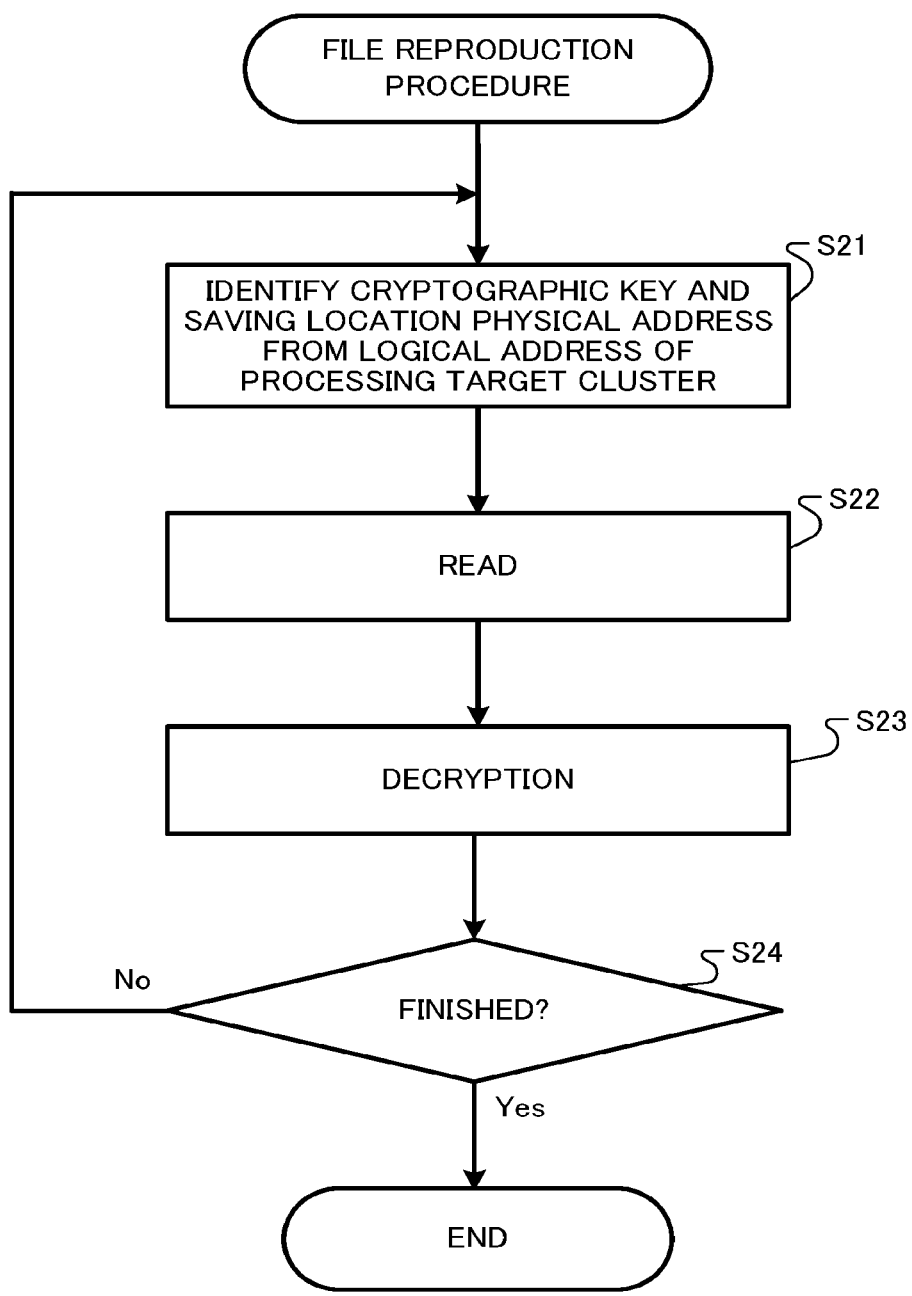
FIG. 4 is a flowchart of the file reproduction procedure executed by the terminal device in FIG. 1.

The file reproduction procedure by the controller 110 will be described next with reference to the flowchart shown in FIG. 4. As a file reading request is made by an application program, the controller 110 starts the file reproduction procedure shown in FIG. 4.

Here, the application specifies a reading target in the form of, for example, the logical address of the first sector constituting the file and the data volume.

First, the controller 110 obtains the logical address of the first cluster and identifies the cryptographic key used in encrypting the processing target cluster and the physical address of the saving location with reference to the file management table FMT (Step S21).

Then, the controller 110 reads the cluster using the physical address identified in the Step S21 (Step S22). Then, the controller 110 decrypts the read cluster using the cryptographic key identified in the Step S21 (Step S23) and transmits the cluster to the application program.

Subsequently, it is determined whether the file reading is finished (Step S24). If not finished (Step S24: No), the processing returns to the Step S21 and the same file reproduction procedure continues on the next cluster.

If it is determined in the Step S24 that the file reading is finished (Step S24: Yes), the file reproduction procedure ends.

With the above configuration, one file is stored in the storages 111 and 112 in a distributed manner. Furthermore, the clusters saved in the storage 111 are encrypted using the cryptographic key KA and the cryptographic key KA is saved in the storage 112. Moreover, the clusters saved in the storage 112 are encrypted using the cryptographic key KB and the cryptographic key KB is saved in the storage 111. Therefore, even if data in either one storage 111 or 112 leak outside, it is difficult to restore the data.

Moreover, the file management program FMP automatically performs the encryption procedure, whereby the control load is low.

As a result, even if a so-called address book as shown in FIG. 5, schedule data as shown in FIG. 6, and the like are saved on the terminal device 10, the risk of information leak is low.

The present disclosure is not confined to the above embodiment and various modifications and applications are available. For example, in the above embodiment, the storages 111 and 112 are detachable. However, only one of them may be detachable or both may be fixed.

Moreover, a case in which data are divided and saved in two storages 111 and 112 is described. The number of storages is determined on an arbitrary basis. Moreover, the division number is determined on an arbitrary basis. The number of encryption keys is also determined on an arbitrary basis.

The storing destination and the cryptographic key are specified by the unit of cluster. However, any unit size can be used and set in consideration of the processing load and the security.

Furthermore, the saving destination of data (divided files) may be an external server, database, or the like connected via a network.

A case in which the encryption method is varied by using different cryptographic keys is shown. However, the encryption algorithm itself may be varied.

Figure 7:
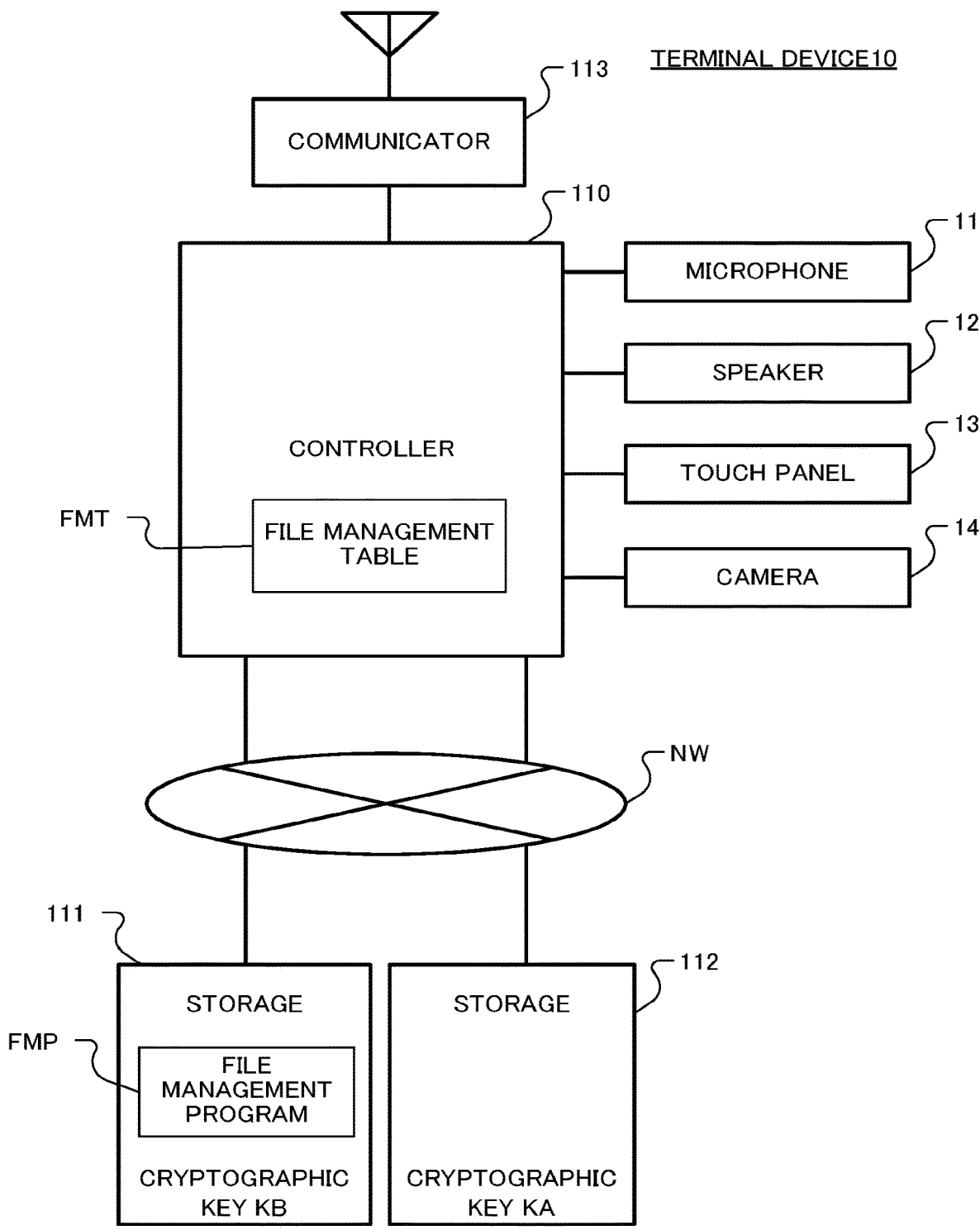

Here, as shown in FIG. 7, the file management table FMT may be stored in a nonvolatile memory such as a flash memory within the controller 110.

Moreover, as shown in FIG. 7, the storages 111 and 112 may be disposed in external devices via a network NW.

In the above embodiment, two cryptographic keys are used for encryption. However, three or more cryptographic keys may be used. Moreover, a file is stored at two storing locations. However, there may be three or more storing locations. For example, when M (an integer equal to or greater than 3) cryptographic keys and N (an integer equal to or greater than 3) storing locations are used, the controller 110 divides the logical address of a cluster by M (an integer equal to or greater than 3) and encrypts the cluster using a cryptographic key specified by the remainder mod (M), and divides the logical address of the cluster by N (an integer equal to or greater than 3) and saves the encrypted cluster at a storing location specified by the remainder mod (N). The controller 110 associates and saves in the file management table FMT the logical address of the cluster, the cryptographic key, and the physical address of the storing location. Here, since the cryptographic key can be identified from the logical address, the cryptographic key may be omitted.

Embodiment 2

The terminal device according to Embodiment 2 of the present disclosure will be described next with reference to the drawings.

In Embodiment 2, a file is saved in a distributed manner by a different method depending on the user, whereby a terminal device securely saving data without imposing a load on the user is provided. Here, the equivalent components to those of the terminal device according to Embodiment 1 are referred to by the same reference numbers.

Figure 8:
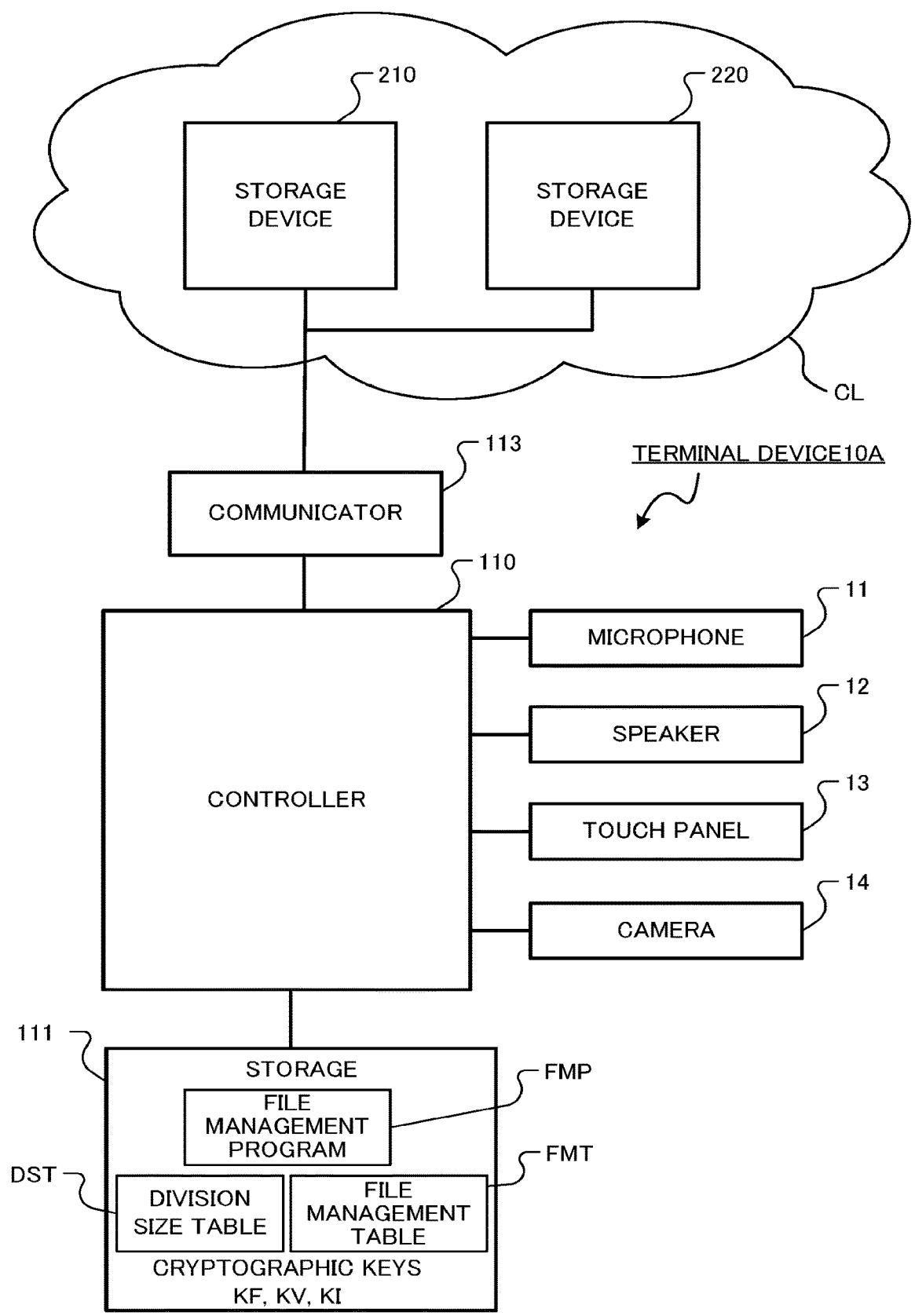

A terminal device 10A of this embodiment is connected to storage devices 210 and 220 on a cloud CL via a network as shown in FIG. 8. The terminal device 10A comprises the function of acquiring biological information of the user, dividing and encrypting a file FI based on the biological information, and transmitting the file to the storage devices 210 and 220. In this embodiment, a case in which the biological information is fingerprints, a voiceprint, and an iris is described.

The terminal device 10A comprises a controller 110, and a microphone 11, a speaker 12, a touch panel 13, a camera 14, a storage 111, and a communicator 113, which are connected to the controller 110.

The microphone 11 picks up voice of the user and gives the voice to the controller 110. The speaker 12 provides information by sound to the user according to an order from the controller 110. The touch panel 13 acquires fingerprints of the user by a touch sensor and gives the fingerprints to the controller 110. The camera 14 captures an image of an iris of the user and transmits the image to the controller 110 according to an order from the controller 110.

The controller 110 comprises a processor, a random access memory (RAM), and the like, and executes application programs and a file management program FMP stored in the storage 111.

The controller 110 executes the file management program FMP to acquire biological information of the user, divide and encrypt various files FI based on the biological information, and transmit and save the files in the storage devices 210 and 220. Moreover, the controller 110 executes the file management program FMP to acquire biological information of the user, and read from the storage devices 210 and 220 and decrypt data into original data based on the biological information.

The storage 111 saves, in addition to the file management program FMP and the file management table FMT, a division size table DST and cryptographic keys KF, KV, and KI.

The file management table FMT of this embodiment includes, as shown in FIG. 9, a data management table DMT and a cluster management table CMT.

The data management table DMT associates and stores a data number i of data obtained by dividing a saving target file FI, a size after encryption, and a cryptographic key used in encryption.

On the other hand, the cluster management table CMT associates and stores a cluster number j, a saving destination physical address, and data numbers i of data included in the cluster.

The division size table DST saved in the storage 111 is a table saving information defining a size into which a saving target file FI is divided. In this embodiment, the division size varies depending on the user's biological information. Therefore, as shown in FIG. 10, the division size table DST associates biological information, a condition for the biological information to satisfy, and a division size to be selected when the condition is satisfied.

In the division size table DST shown in FIG. 10, as conditions for fingerprint information, a magnitude correlation between the number of end points and the number of branch points of a fingerprint is established. As conditions for voiceprint information, a magnitude correlation between the frequency of the highest sound volume, $f_{top}$, and the frequency of the second highest sound volume, $f_{second}$, is established. As conditions for iris information, a magnitude correlation between the number of 1s, $N_1$, and the number of 0s, $N_0$, in an iris code is established.

The communicator 113 shown in FIG. 8 communicates with the storage devices 210 and 220 on the cloud CL.

The file saving procedure executed by the controller 110 executing the file management program FMP will be described next with reference to FIGS. 11 to 14.

The file saving procedure in this embodiment is a procedure to divide a file FI into data of a size based on biological information of the user, encrypt the divided file FI based on the biological information, and save the divided file FI in a distributed manner.

Figure 11:
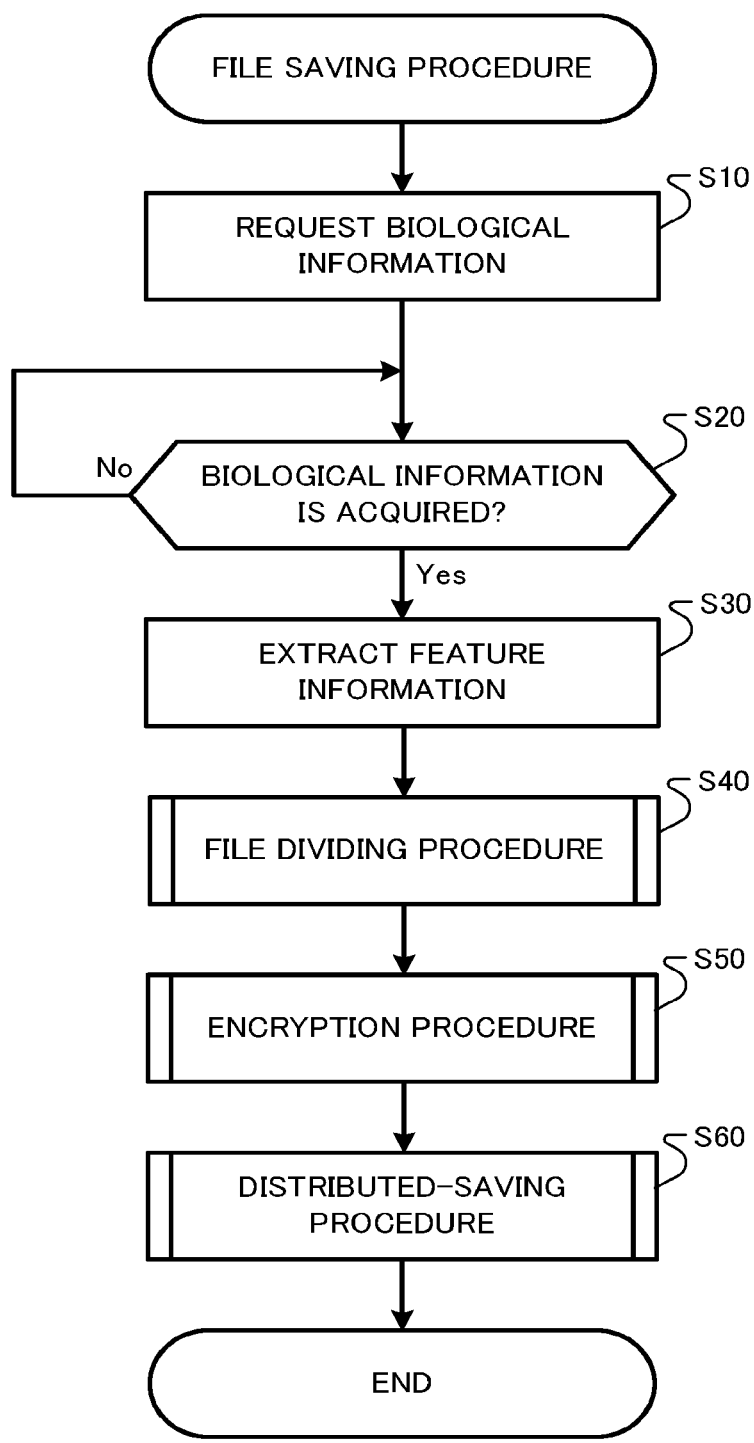
FIG. 11 is a flowchart of the file saving procedure executed by the terminal device shown in FIG. 8.

As the user or application software makes a request for saving a file FI, the controller 110 starts the procedure to save a file FI shown in FIG. 11.

First, the controller 110 requests the user to enter biological information (fingerprint information, voiceprint information, and iris information) (Step S10). Specifically, the controller 110 displays on the display of the touch panel 13 a content giving an order to place a finger pad on the touch sensor, utter given words into the microphone 11, and stare at the camera 14.

Subsequently, the controller 110 orders each of the touch panel 13, the microphone 11, and the camera 14 to acquire biological information and determines whether the biological information is acquired (Step S20). The controller 110 waits until all biological information requested is acquired (Step S20; No). On the other hand, if determined that all biological information requested is acquired (Step S20; Yes), the controller 110 extracts feature information from the acquired biological information (Step S30).

The controller 110 extracts, for example, the positions of end points and branch points included in the fingerprint as feature information of the fingerprint information. Moreover, the controller 110 extracts the frequencies at sound volume peaks in the sound spectrum and their order by the sound volume as feature information of the voiceprint information. Moreover, the controller 110 extracts an iris code as feature information of the iris information.

Extracting the feature information from the biological information, the controller 110 executes the file dividing procedure to divide a saving target file FI (Step S40), executes the encryption procedure to encrypt each of the divided files FI (data) (Step S50), and finishes the divided-saving procedure to save the encrypted, divided files FI in the storage devices 210 and 220 in a distributed manner (Step S60).

The file dividing procedure (Step S40) to the distributed-saving procedure (Step S60) executed in the file saving procedure will be described next with reference to FIGS. 12 to 14.

Figure 14:
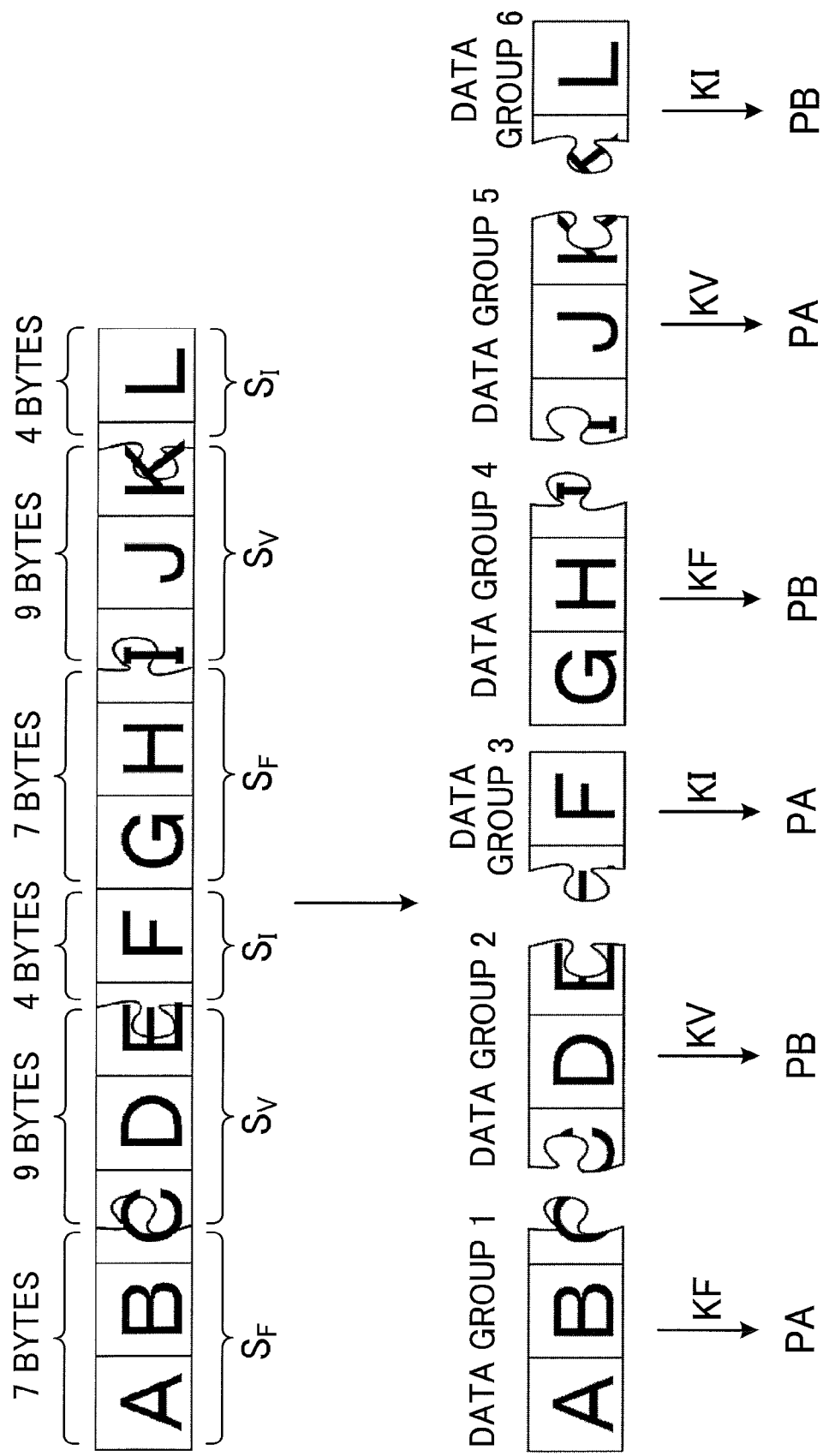
FIG. 14 is a chart showing a practical example of the file saving procedure shown in FIG. 11.

First, the file dividing procedure will be outlined using a case in which a file FI constituted by text information "ABCDEFGHIJKL" shown in FIG. 14 is divided.

The controller 110 divides data constituting the file FI into data of sizes specified by the biological information in the file dividing procedure. For example, one character of hiragana and kanji of the Japanese language is expressed by three bytes in the Unicode transformation format-8 (UTF-8). It is assumed that in the example shown in FIG. 14, each character of "ABCDEFGHTIJKL" is expressed by three bytes. Here, the controller 110 divides the file FI into seven bytes, nine bytes, four bytes, . . . from the beginning according to the biological information so as to include data of sizes (the number of bytes) that are not dividable by three. As a result, the character codes of "C," "E," "I, " and "K" are each divided in the middle. As a result, even if some of the data 1 to 6 leak, it is difficult to decipher the file FI. In this embodiment, the file FI is divided as described above.

Detailed proceedings of the file dividing procedure (Step S40) and the encryption procedure (Step S50) will be described next.

Figure 12:
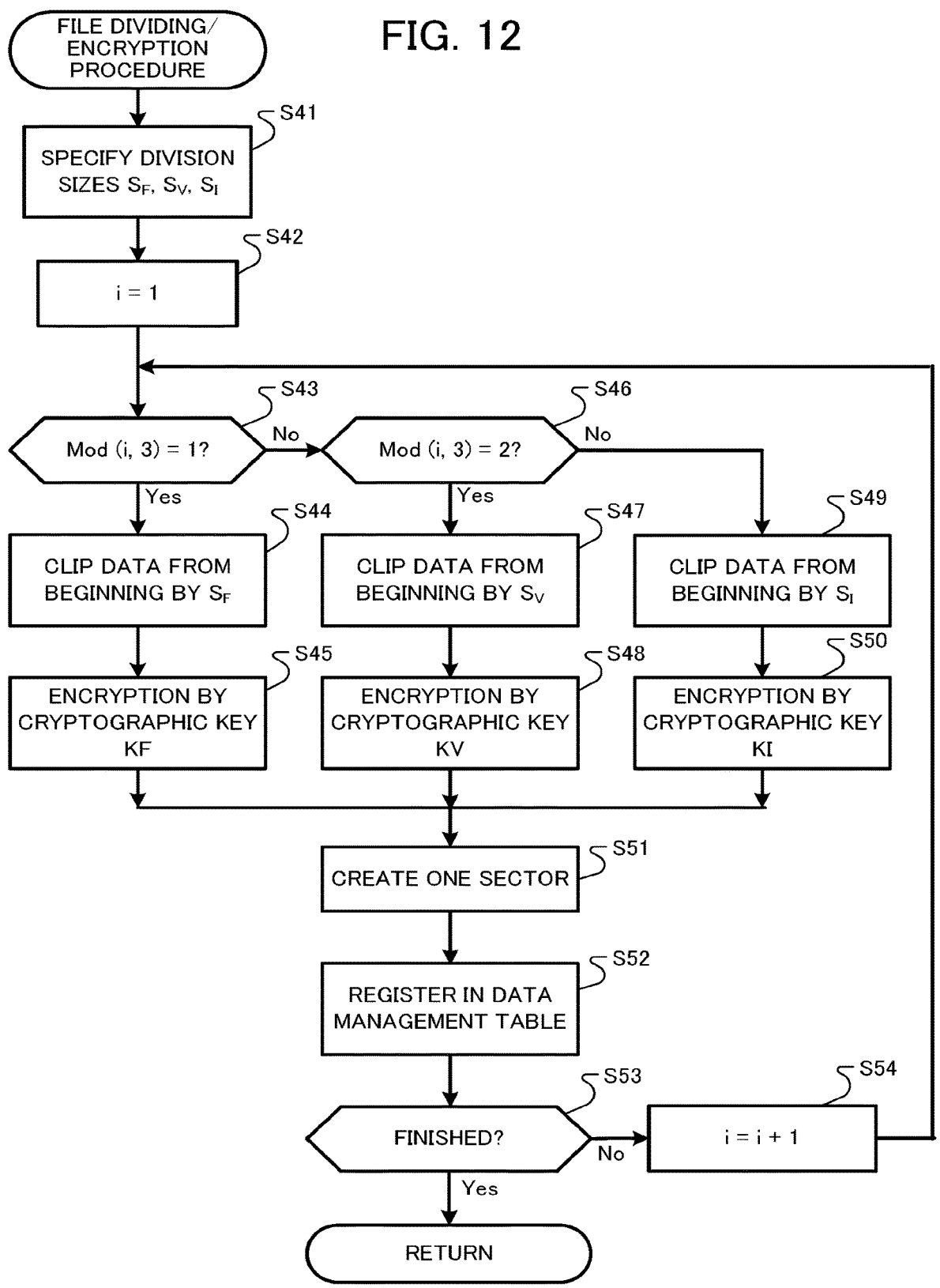
FIG. 12 is a flowchart showing exemplary details of the file dividing procedure and the encryption procedure shown in FIG. 11.
Figure 13:
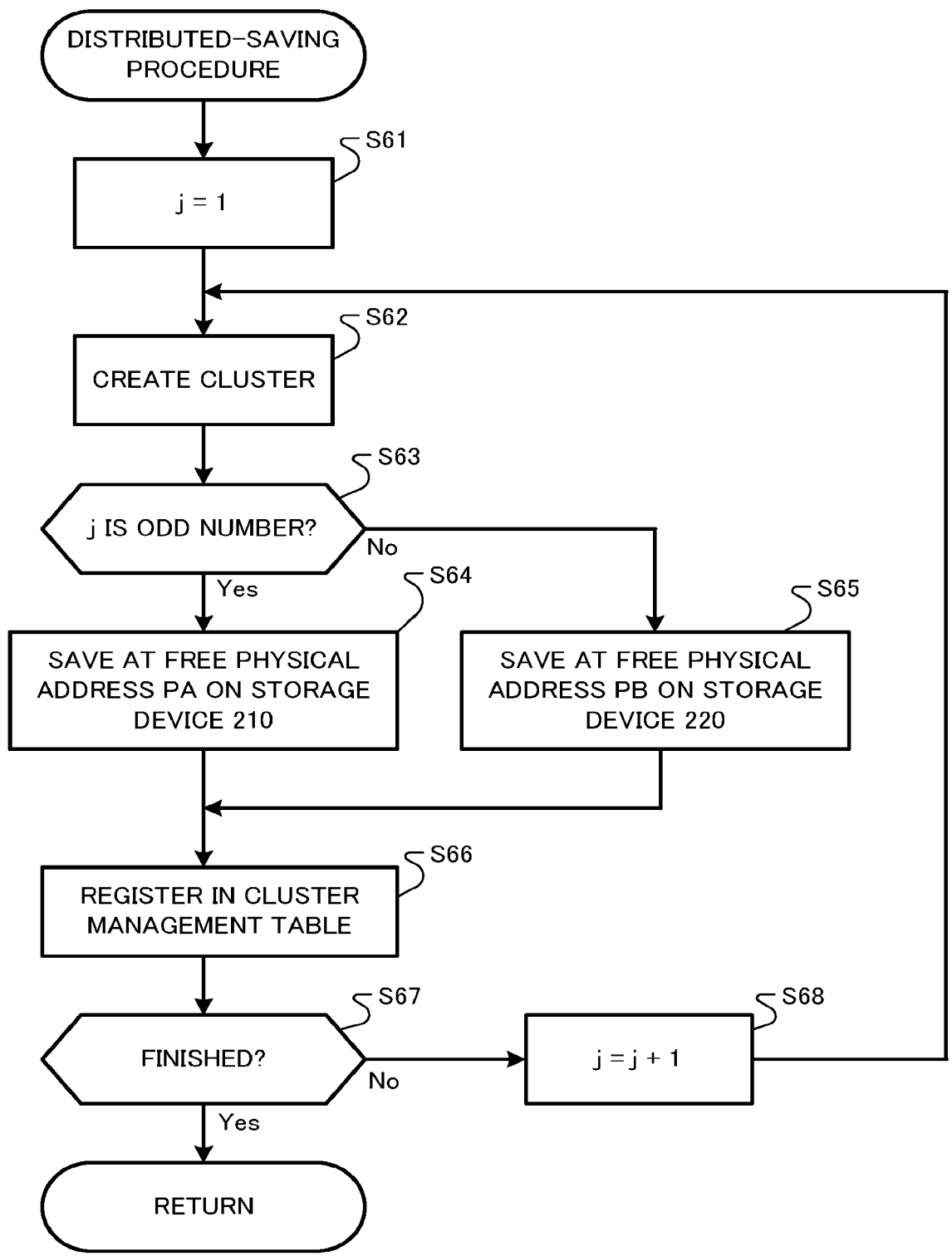
FIG. 13 is a flowchart showing exemplary details of the distributed-saving procedure shown in FIG. 11.

Starting the file dividing procedure, as shown in FIG. 12, the controller 110 first obtains three division sizes S, a fingerprint information-based division size $S_F$, a voiceprint information-based division size $S_V$, and an iris information-based division size $S_I$, based on the feature information extracted in the Step S30 with reference to the division size table DST saved in the storage 111 (Step S41).

According to the division size table DST shown in FIG. 10, for example assuming that the number of end points and the number of branch points of the fingerprint are 4 and 5, respectively, the frequency at the highest sound volume, $f_{top}$, and the frequency at the second highest sound volume, $F_{second}$, of the voiceprint are 300 Hz and 400 Hz, respectively, the number of 1s, $N_1$, and the number of $O_S$, $N_O$, in the iris code are 1005 and 1043, respectively, the number of end points<the number of branch points is satisfied and a division size $S_F$ of 503 bytes is selected in regard to the fingerprint, $f_{top}<f_{second}$ is satisfied and a division size $S_V$ of 491 bytes is selected in regard to the voiceprint, and $N_1<N_O$ is satisfied and a division size $S_I$ of 479 is selected in regard to the iris.

The division size S is set smaller than one sector (512 bytes) that is the unit in conventional data processing. Furthermore, the division size S is set to a prime number of bytes. The division size S is set smaller than one sector.

Specifically, subsequently, the controller 110 sets a pointer i presenting the data number to an initial value "1" (Step S42).

Then, it is determined which the value of the remainder Mod (i, 3) of the value i divided by 3 is, 1, 2, or 0 (Steps S43 and S46).

If Mod (i, 3)=1 (Step S43; Yes), the controller 110 clips the corresponding amount of data to the division size $S_F$ from the beginning of the remaining data of the file FI (Step S44). The controller 110 encrypts the clipped data using the cryptographic key KF (Step S45).

If Mod (i, 3)=2 (Step S43; No, Step S46; Yes), the controller 110 clips the corresponding amount of data to the division size $S_V$ from the beginning of the remaining data of the file FI (Step S47). The controller 110 encrypts the clipped data using the cryptographic key KV (Step S48).

If Mod (i, 3)=0 (Step S43; No, Step S46; No), the controller 110 clips the corresponding amount of data to the division size $S_I$ from the beginning of the remaining data of the file FI (Step S49). The controller 110 encrypts the clipped data using the cryptographic key KI (Step S50).

Figures 15, 16:
FIG. 15 is a chart showing an exemplary configuration of a sector.
FIG. 16 is a chart showing an example of the cryptographic key table for changing the cryptographic key according to the biological information.

The size of the encrypted data varies and it is difficult to process the data by a computer as they are. Then, the controller 110 combines the data encrypted in the Step S45, S48, or S50 with pad data to create a sector of data as shown in FIG. 15 (Step S51).

Then, as shown in FIG. 9, the data number i, the size of the encrypted data, and the cryptographic key used in encryption are registered in the data management table DMT (Step S52).

Subsequently, it is determined whether unprocessed data are 0 byte and if not 0 byte (Step S53; No), the data number i is incremented by +1 (Step S54) and the processing returns to the Step S43 to clip data from the saving target file FI and encrypt the data.

If determined in the Step S53 that unprocessed data are 0 byte (Step S53; Yes), the processing returns to the main flow.

As described above, in the file dividing/encryption procedure, the controller 110 clips from a saving target file FI data of the division size $S_F$ determined by the fingerprint, the division size $S_V$ determined by the voiceprint, and the division size $S_I$ determined by the iris in sequence. The controller 110 encrypts the clipped data using the cryptographic keys KF, KV, and KI in sequence and creates sectors of data in sequence.

Details of the distributed-saving procedure (Step S60) shown in FIG. 11 will be described next with reference to FIG. 13.

Sector data including the encrypted data are created in sequence in the dividing/encryption procedure. The created sector data are grouped into clusters of eight each and saved in the storage devices 210 and 220.

To do so, the controller 110 initializes the cluster number j presenting the cluster number to 1 (Step S61).

Then, the sector data created in the dividing/encryption procedure are combined eight each in sequence to create a cluster (Step S62).

Then, the controller 110 determines whether the cluster number j of a saving target cluster is an odd number or an even number (Step S63). If the cluster number j is an odd number (Step S63: Yes), the cluster is saved at a free physical address PA on the storage device 210 (Step S64).

Subsequently, the controller 110 associates and registers in the cluster management table CMT the cluster number j of the processed cluster, the physical address PA of the saving area, and the data number i of the data included in the cluster as shown in FIG. 9 (Step S66).

Subsequently, the controller 110 determines whether saving of the file FI is finished (Step S67) and if not finished (Step S67: No), the cluster number j is incremented by +1 (Step S68). Subsequently, the processing returns to the Step S62 to process the next cluster.

On the other hand, if determined in the Step S63 that the cluster number j is an even number (Step S63: No), the controller 110 saves the cluster at a free physical address PB on the storage device 220 (Step S65).

Subsequently, the controller 110 proceeds to the above-described Step S66.

If determined in the Step S67 that saving of the file FI is finished (Step S67: Yes), the file saving procedure ends.

The file reproduction procedure by the controller 110 will be described next.

As a decryption target file FI is specified, the controller 110 reads the cluster management table CMT for that file FI, identifies the saving destination physical address, and reads the clusters in sequence.

Then, the controller 110 extracts, from each sector included in the read clusters, the encrypted data from the sectors included in each read cluster according to the contents of the cluster management table CMT and data management table DMT.

the controller 110 decrypts the extracted data using a proper cryptographic key based on the contents of the data management table DMT.

Then, the original data (the file FI) are reproduced by concatenating the decrypted data in the order of data number i.

Moreover, since the file FI is divided into data clusters of sizes unique to the user and unrecognizable by a computer as they are, even if some of the data leak, it is difficult to decipher the leaked clusters and the risk of information leak is low.

The present disclosure is not confined to the above embodiment and various modifications and applications are available. For example, in the above embodiment, the storage devices 210 and 220 are devices on the cloud CL. However, the storage devices 210 and 220 may be devices locally connected to the terminal device 10.

Moreover, a case in which the file FI is divided and saved in the two storage devices 210 and 220 is described. However, the number of storage devices is determined on an arbitrary basis. Moreover, the division size S is determined on an arbitrary basis. The number of encryption keys is also determined on an arbitrary basis.

In the above embodiment, a case in which the division size of a file FI is obtained (calculated) using the division size table is described. However, the method of calculating the division size S is not restricted thereto. It may be possible for the terminal device 10 to obtain the division size S from the acquired biological information by converting the feature information extracted from the biological information acquired by the controller 110 using any function (conversion information) or other methods.

Moreover, the above conversion information is not necessarily saved in the storage 111 within the terminal device 10 and may be saved, for example, on a server connected to the terminal device 10 via a network or the like. For calculating the division size S, the terminal device 10 may temporarily save in the storage 111 the conversion information saved on a server and convert the biological information to the division size S, or may make the server calculate the division size S and download the division size S.

Moreover, as the biological information acquired by the terminal device 10, three kinds, fingerprint information, voiceprint information, and iris information, are described. However, other kinds of biological information may be used. For example, the terminal device 10 may learn a habit in handwriting of the user and divide the file FI into a division size S based on the peculiar handwriting photographed by a camera or the peculiar handwriting made on the touch panel 13.

In the above embodiment, the division size S is determined based on the feature information extracted from the biological information of the user. However, it may be possible to determine an encryption method including an encryption key based on the biological information.

For example, as shown in FIG. 16, it may be possible to set cryptographic keys according to conditions for the biological information to satisfy and select a cryptographic key according to the biological information. In the example of the cryptographic key table EKT of FIG. 16, one of cryptographic keys KF1 and KF2 is selected and used in the Step S45, one of cryptographic keys KV1 and KV2 is selected and used in the Step S48, and one of cryptographic keys KI1 and KI2 is selected and used in the Step S50. Here, the number of cryptographic keys to use may further be increased.

Moreover, the biological information or the feature amounts may be converted to a cryptographic key using a function or the like.

Moreover, the saving destination of a file FI may also be determined based on the biological information. For example, as shown in FIGS. 17A and 17B, it may be possible to set cluster saving destinations according to conditions for the biological information to satisfy and select a saving destination according to the biological information.

In Embodiment 2, as the data number i is determined, the biological information to refer to for encryption is determined. However, it may be possible to change the biological information to refer to for encryption based on the biological information.

For example, as shown in FIGS. 18A and 18B, it may be possible to associate a condition for specific biological information to satisfy and biological information (feature amounts) to refer to when the condition is satisfied. In the example of FIG. 18A, if determined from the feature amounts of the entered fingerprint information that the number of end points≥(the number of branch points+5) is satisfied, the procedure shown in FIG. 12 is executed. On the other hand, if determined that the number of end points<(the number of branch points+5) is satisfied, for example, the iris information is referred to when Mod (3)=2. Therefore, data are clipped to the division size S corresponding to the iris (487 bytes or 479 bytes in the example of FIG. 10) in the Step S47 and encrypted using the cryptographic key KI in the Step S48. Here, a modification can be made to use KI1 or KI2 shown in FIG. 16 as the cryptographic key in the Step S48.

In FIG. 15, pad data are placed in the trailing space for making a sector of data from the clipped data of a size S. However, it may be possible to change the position of pad data based on the biological information.

For example, as shown in FIG. 19, it may be possible to associate a condition for specific biological information to satisfy and a pad data position when the condition is satisfied. In the example of FIG. 19, if determined from the feature amounts of the entered iris information that $N_1 \geq N_0$ is satisfied, as shown in FIG. 20A, pad data are placed at the beginning of a sector. On the other hand, if determined from the feature amounts of the entered iris information that $N_1 < N_0$ is satisfied, as shown in FIG. 20B, the first 100 bytes of data of a size S clipped from the saving target file are placed at the beginning of a sector, which is followed by pad data as much as (the size of one sector of data−S) and the remaining clipped data. In such a case, it is desirable that the pad data position and size are registered in the data management table DMT.

In the above embodiment, a case in which the feature amounts extracted from the entered biological information are referred to for encryption is described. However, it may be possible to refer to preregistered biological information or feature amounts. For example, biological information or its feature amounts for authentication are registered at the time of user registration and stored in the controller 110 or in the storage 111 or 112. For using the terminal device 10 or 10A, the user enters biological information from the microphone 11, the touch panel 13, and the camera 14. The entered biological information is compared with the registered biological information or feature amounts for authenticating the user. After the user is authenticated, the biological information or feature amounts referred to for encryption/decryption may be the registered biological information or feature amounts. With this configuration, although the entered biological information may change depending on the environment of use and/or operation of the terminal device 10 or 10A, the registered biological information and/or feature amounts do not change and the encryption/decryption can stably be performed.

In the embodiments, several tables are shown. These do not need to be in the form of a table. As long as necessary information is derived, these can be in the form of a function or a program. Moreover, some of the information may be eliminated or other information for deriving that information may be registered. For example, the cryptographic key KA or KB in the file management table FMT shown in FIG. 2D can be derived from the logical address Li and therefore may be eliminated. In such a case, the logical address Li functions as information identifying the cryptographic key used in encryption. The cryptographic keys KF, KV, and KI in the data management table DMT shown in FIG. 9 may also be eliminated. Moreover, for example, the data number in the cluster management table CMT shown in FIG. 9 can also be eliminated. The j-th cluster includes data having the data numbers i of 8×(j−1)+1 to 8×j.

As the biological information to refer to for encryption/decryption, fingerprint information, voiceprint information, and iris information are used by way of example. However, the type of biological information is not restricted thereto. For example, other than these, vein information, face information, palm print information, signature information, and the like may be retrieved as biological information. The number of types of information to use is not limited to three and may be one, two, or greater than three.

Moreover, the arrangement of devices/parts can be changed on an arbitrary basis. The terminal device 10 executing the above described procedures may be configured by saving and distributing a computer program for making a computer function as the terminal device 10 on a non-transitory computer-readable recording medium (CD-ROM and the like) and installing the program on a computer.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The present disclosure is based on Japanese Patent Application No. 2015-093729, filed on Apr. 30, 2015, of which the specification, the scope of claims, and the drawings are entirely incorporated herein by reference.

REFERENCE SIGNS LIST

10 Terminal device
11 Microphone
12 Speaker
13 Touch panel
14 Camera
111, 112 Storage
113 Communicator
210, 220 Storage device
CL Cloud

The invention claimed is:

1. A terminal device, comprising:
   a hardware processor configured to:
      acquire biological information of a user;
      divide a saving target file to create divided files;
      select a plurality of encryption methods and a plurality of storing destinations based on the biological information acquired;
      encrypt the divided files using the selected encryption methods; and
      save the encrypted, divided files at the selected storing destinations.

2. The terminal device according to claim 1, wherein the biological information includes multiple kinds of the biological information, and
   the hardware processor is configured to:
      select the plurality of encryption methods and the plurality of storing destinations based from each of the multiple kinds of biological information.

3. The terminal device according to claim 2, wherein the hardware processor is configured to:
      select one of the plurality of encryption methods and/or one of the plurality of storing destinations based on a value of every kind of biological information.

4. The terminal device according to claim 2, wherein the hardware processor is configured to:
      select one of the plurality of encryption methods and/or one of the plurality of storing destinations based on whether or not a condition set for every kind of biological information is satisfied.

5. The terminal device according to claim 1, wherein the hardware processor is further configured to:
      select at least one encryption key or at least one encryption algorithm based on the biological information acquired.

6. The terminal device according to claim 1, wherein the hardware processor is further configured to:
      specify a file to be restored, specify at least one storing destination in which the encrypted, divided files formed from the specified file are stored, and at least one encryption method used for encrypting the divided files formed from the specified target file based on the stored information, and reproduce the specified target file by reading the specified encrypted, divided files from the specified at least one storage destination and decrypting the read encrypted, divided files based on the specified at least one encryption method.

7. The terminal device according to claim 1, further comprising:
a storage configured to store identifying information identifying the divided files, the encryption methods used for encrypting the divided files, and the storing destinations at which the encrypted, divided files are stored.

8. The terminal device, according to claim 7, wherein the hardware processor is further configured to:
save the encrypted, divided files at the storing destinations located in a first storage device;
save the identifying information in the storage located in a second storage device different from the first storage device.

9. The terminal device according to claim 8, wherein at least one of the first storage device or the second storage device is detachably mounted on the terminal device.

10. A non-transitory recording medium storing a computer program, which when executed by a computer, causing the computer to:
divide a saving target file to create divided files;
acquire biological information of a user,
select a plurality of encryption methods and a plurality of storing destinations based on the biological information acquired;
encrypt the divided files using the selected encryption methods; and
save the encrypted, divided files at the selected storing destinations.

11. The non-transitory recording medium according to claim 10, wherein the computer program, which when executed by the computer, causes the computer to store, in a storage, identifying information identifying the divided files, the encryption methods used for encrypting the divided files, and the storing destinations at which the encrypted, divided files are stored.

12. A file processing method, comprising:
dividing a saving target file to create divided files;
acquiring biological information;
selecting a plurality of encryption method and a plurality of storing destinations;
encrypting the divided files with using the selected encryption methods; and
saving the encrypted, divided files at the selected storing destinations.

13. The file processing method according to claim 12, further comprising:
storing, in a storage, identifying information identifying the divided files, the encryption methods used for encrypting the divided files, and the storing destinations at which the encrypted, divided files are stored.

* * * * *